United States Patent Office 3,275,634
Patented Sept. 27, 1966

3,275,634
7-HYDROXY-2,4-DIOXO-1,2,3,4,5,6-HEXAHYDRO-PYRIDO[2,3-d]PYRIMIDINES
Viktor Papesch, Morton Grove, Ill., assignor to G. D. Searle & Co., Chicago, Ill., a corporation of Delaware
No Drawing. Filed Sept. 2, 1965, Ser. No. 484,748
5 Claims. (Cl. 260—256.4)

The present invention relates to a group of trioxygenated bicyclic, heterocyclic compounds. More specifically, the present invention relates to compounds of the following general formula

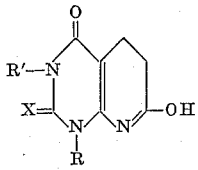

wherein X is selected from the group consisting of O and S; R is selected from the group consisting of lower alkyl and lower alkenyl; and R' is lower alkyl. The lower alkyl radicals referred to above contain up to 6 carbon atoms and can be exempified by radicals such as methyl, ethyl, propyl, butyl, and hexyl. The lower alkenyl radicals referred to above likewise contain up to 6 carbon atoms and can be exemplified by radicals such as allyl and methallyl.

The compounds of this invention are useful because of their pharmacological properties. In particular, the present compounds are useful as anti-ulcer agents; this is demonstrated by their inhibition of ulceration in the Shay rat. The present compounds also show anti-inflammatory activity which is demonstrated by a phenylbutazone-like effect on edematous conditions. They also show activity as diuretic agents and as hypocholesterolemic agents.

The compounds of the present invention are conveniently prepared from the corresponding 7-amino compounds which have the formula

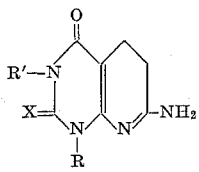

wherein R, R' and X are defined as above. The amino compound can be conveniently diazotized at ice-bath temperatures to give the corresponding hydroxy compound. Alternately, carefuly hydrolysis of the amino compounds in acid solution will give the hydroxy compounds of the present invention.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that existing between grams and milliliters.

Example 1

A solution is prepared from 1.5 parts of 7-amino-1,3-dimethyl-2,4-dioxo - 1,2,3,4,5,6 - hexohydropyrido[2,3-d]pyrimidine and 10 parts of 10% hydrochloric acid. To this solution is added, portionwise, 0.6 part of sodium nitrite in 5 parts of water while the solution is stirred and the temperature is maintained at 2–4° C. Stirring is then continued for 30 minutes at 2–4° C. and then for about 4 hours at room temperature. Finally, the mixture is heated on a steam bath. It is then cooled and the precipitate which forms is separated by filtration and washed with water and then recrystallized from methanol to give 7-hydroxy-1,3-dimethyl-2,4-dioxo-1,2,3,4,5,6-hexahydropyrido[2,3-d]pyrimidine melting at about 230–231° C. This compound has the following formula

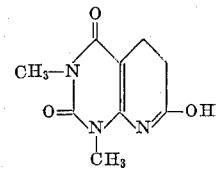

The necessary starting material is obtained by the following procedure. 50 parts of 6-amino-1,3-dimethyluracil is ground to a fine powder, mixed with 260 parts by volume of a 50% by volume pyridine-water mixture and with 40 parts of acrylonitrile and refluxed for 3 hours. The resultant mixture is cooled and filtered. The solid obtained in this way is washed with water and acetone and then recrystallized from dimethylformamide. The product obtained is 7-amino-1,3-dimethyl-2,4-dioxo-1,2,3,4,5,6-hexahydropyrido[2,3-d]pyrimidine and it melts above 360° C.

Example 2

To a solution of 15 parts of 7-amino-1,3-diethyl-2,4-dioxo - 1,2,3,4,5,6 - hexahydropyrido[2,3-d]pyrimidine in 100 parts of 10% hydrochloric acid there is added, portionwise with stirring at −7° C., a solution of 6 parts of sodium nitrite in 50 parts of water. The mixture is stirred for 30 minutes at −7 to 0° C. and then allowed to warm to room temperature and stirred for an additional 30 minutes. The mixture is then filtered to remove some sticky solid and the resultant filtrate is cooled for 16 hours at ice-bath temperature. The solid which precipitates is then filtered and washed with water before it is recrystallized from water to give 7-hydroxy-1,3-diethyl-2,4-dioxo-1,2,3,4,5,6 - hexahydropyrido[2,3-d]pyrimidine melting at about 208–209° C.

Example 3

3.8 parts of 7-amino-1,3-dimethyl-4-oxo-2-thio-1,2,3,4,-5,6-hexahydropyrido[2,3-d]pyrimidine is dissolved in 150 parts of 10% hydrochloric acid at −6° C. Then, a solution of 1.5 parts of sodium nitrite in 15 parts of water is added portionwise at −6° C. with stirring. The mixture is stirred at −6° C. for 30 minutes before it is allowed to warm to room temperature and stirred for an additional 30 minutes. The solution is then cooled at ice bath temperature for 16 hours. The precipitate which forms is separated by filtration and then recrystallized from water to give 7-hydroxy-1,3-dimethyl-4-oxo-2-thio-1,2,3,4,5,6-hexahydropyrido[2,3-d]pyrimidine melting at about 255–257° C. This compound has the following formula

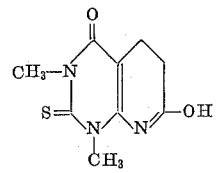

Example 4

4 parts of 7-amino-1-allyl-3-ethyl-2,4-dioxo-1,2,3,4,5,6-hexahydropyrido[2,3-d]pyrimidine is dissolved in 315 parts of tetrahydrofuran and the solution is made acidic by the addition of hydrochloric acid. The hydrochloride salt precipitates and 50 parts of water is added to the mixture to redissolve the salt. The mixture is then allowed to stand for 20 hours before about half of the solvent is removed my evaporation at room temperature under reduced pressure. The residual solution is diluted with chloroform and water and then extracted with several portions of chloroform. The combined chloroform extracts are washed with water and then dried over sodium sulfate. The solvent is then removed under reduced pressure to leave a residue which is recrystallized twice from benzene to give 7-hydroxy-1-allyl-3-ethyl-2,4-dioxo-1,2,3,4,5,6-hexahydropyrido[2,3-d]pyrimidine melting at about 178–182° C.

What is claimed is:
1. A compound of the formula

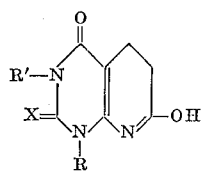

wherein R is selected from the group consisting of lower alkyl and lower alkenyl; R' is lower alkyl; X is selected from the group consisting of O and S.

2. A compound of the formula

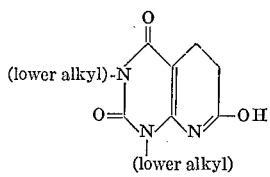

3. 7-hydroxy-1,3-dimethyl - 2,4-dioxo-1,2,3,4,5,6-hexahydropyrido[2,3-d]pyrimidine.
4. 7-hydroxy-1,3-diethyl - 2,4-dioxo-1,2,3,4,5,6-hexahydropyrido[2,3-d]pyrimidine.
5. 7-hydroxy-1-allyl-3-ethyl-2,4-dioxo - 1,2,3,4,5,6-hexahydropyrido[2,3-d]pyrimidine.

References Cited by the Applicant

Ridi et al., Ann. chim. (Rome), 45, 439 (1955); C.A., 50, 5677h (1956).
Ridi et al., Ann. chim. (Rome), 50, 505–20 (1960); C.A., 55, 554a (1961).

ALEX MAZEL, *Primary Examiner.*
MARY U. O'BRIEN, *Assistant Examiner.*